Patented Jan. 1, 1952

2,581,038

UNITED STATES PATENT OFFICE 2,581,038

CHOLINE PREPARATIONS

Leonhard Middendorf, Frankfurt (Main)-Hoechst, Germany, assignor to Farbwerke Hoechst vormals Meister Lucius & Bruning, Frankfurt (Main), Germany No Drawing. Application April 19, 1949, Serial No. 88,500. In Germany October 1, 1948

4 Claims. (Cl. 167—82)

The present invention relates to choline preparations and to a process of preparing them.

Up to the present time it has appeared to be virtually impossible to administer by mouth the hygroscopic salts of choline and the compounds thereof, which salts have long been well known as parasympathetic stimulating drugs, that is they manifest a vasodilatory, blood pressure lowering and gastro-intestinal peristalsis promoting action. These bodies have an extremely unpleasant taste which cannot be masked by additions. After ingestion these bodies cause a very disagreeable eructation. The patient cannot be expected to tolerate the oral administration of the drug in a liquefied form. Furthermore, the specified salts, as for instance the chlorides of choline and acetyl choline, may easily provoke irritation of the various mucous membranes. These disadvantages are still further aggravated by the fact that for instance acetyl-choline is quickly rendered ineffective in the body by the blood ferments, so that relatively large and frequent doses must be administered to ensure therapeutic success. Moreover the specified compounds are of a hygroscopicity such that it has hitherto not been feasible to process them in the required dose to reasonably stable, formed and orally applicable preparations, such as tablets, pills or capsules. For all these reasons these compounds have long been almost exclusively utilized for parenteral or rectal administration.

Now I have found that the hygroscopic salts of choline and its compounds can be prepared in a form for oral administration meeting all requirements of practice by processing these compounds, after liquefaction with water and/or another liquefying agent, with a physiologically tolerable fat, oil, higher hydrocarbon or the like to concentrated, finely dispersed, stable emulsions of the water-in-oil type. These emulsions are, for example, filled into gelatin, polyvinyl alcohol or the like capsules, which are sufficiently soluble in the digestive juice.

Such capsules are swallowed whole, thus avoiding the disadvantage of the unpleasant taste of the drug. On account of the fact that the homogeneously dispersed active substance in the emulsion constitutes the disperse phase, being surrounded by the oily phase, contact with the mucous membranes of the gastro-intestinal tract, after the dissolving of the walls of the capsules in the digestive juice, is more uniform and only occurs gradually. In this way, as experience has shown, the disagreeable eructation as well as irritation of the mucous membranes of the gastrointestinal tract are suppressed without causing a reduction of the pharmacological properties of the drug. In order to cause the dissolving to occur entirely in the intestine, gelatin capsules may, if desired, be treated in the known manner with formaldehyde, by means of which they are rendered insoluble in the gastric juice.

The hygroscopicity of the choline compounds has been rendered ineffective by the dispersion in the fatty emulsion phase. The capsules manufactured according to the above-mentioned process may, therefore, be stored for years without undergoing any detrimental change.

The following example serves to illustrate the invention, but it is not intended to limit it thereto, the parts being by weight:

100 parts of choline chloride are converted into the liquid form by addition of
25 parts of distilled water and thereupon this liquid product is processed with a mixture consisting of
25 parts of wool fat and
50 parts of fatty oil to a homogeneous emulsion which is viscous at room temperature.

This emulsion is filled into soft, easily swallowed gelatin capsules.

I claim:

1. A capsule soluble in digestive juice and containing an emulsion of liquefied hydrated choline chloride as the dispersed phase in a physiologically tolerable oleaginous medium of the class consisting of fats and higher hydrocarbons.

2. A water-in-oil wool-fat-containing emulsion of liquid hydrated choline chloride in a fatty oil.

3. An orally administrable pharmaceutical capsule made of material soluble in digestive juice and containing a water-in-oil emulsion of liquid hydrated choline chloride in a fatty oil.

4. The combination as defined by claim 3 in which the capsule material is insoluble in gastric juice.

LEONHARD MIDDENDORF.

REFERENCES CITED

The following references are of record in the file of this patent:

FOREIGN PATENTS

| Number | Country | Date |
|---|---|---|
| 593,271 | Germany | Feb. 23, 1934 |

OTHER REFERENCES

Dimitry—Urologic & Cutaneous Review, vol. 49, Feb. 1945, pp. 91, 92 (Copy in Div. 43).

U. S. Dispensatory, 24th Ed. (1947) pp. 1400, 1401 (Copy in Div. 43).

U. S. Dispensatory, 23d Ed. (1943) p. 258 (Copy in Div. 43).